(12) United States Patent
Kim et al.

(10) Patent No.: US 9,926,632 B2
(45) Date of Patent: Mar. 27, 2018

(54) PORTABLE APPARATUS FOR PRODUCING HYDROGEN WATER

(71) Applicant: SOLCO BIOMEDICAL CO., LTD., Pyungtaek-shi (KR)

(72) Inventors: Seo-Kon Kim, Anyang-shi (KR); Mal-Soo Lee, Buchun-shi (KR); Hyun Heo, Suwon-shi (KR); Do-Soo Han, Pyungtaek-shi (KR); Dong-Soo Lim, Pyungtaek-shi (KR)

(73) Assignee: SOLCO BIOMEDICAL CO., LTD., Pyungtaek-Shi (KR)

( * ) Notice: Subject to any disclaimer, the term of this patent is extended or adjusted under 35 U.S.C. 154(b) by 222 days.

(21) Appl. No.: 14/594,250

(22) Filed: Jan. 12, 2015

(65) Prior Publication Data

US 2015/0197863 A1   Jul. 16, 2015

(30) Foreign Application Priority Data

Jan. 13, 2014 (KR) .................. 10-2014-0003874
Jun. 18, 2014 (KR) .................. 10-2014-0074472

(51) Int. Cl.
*C25B 1/00* (2006.01)
*C25B 9/08* (2006.01)
(Continued)

(52) U.S. Cl.
CPC .............. *C25B 1/04* (2013.01); *C02F 1/4676* (2013.01); *C25B 9/08* (2013.01); *C25B 11/03* (2013.01);
(Continued)

(58) Field of Classification Search
CPC .... C25B 9/06; C25B 9/08; C25B 9/00; C25B 15/02; C25B 1/00; C25B 1/04; C25B 1/10; Y02E 60/366
(Continued)

(56) References Cited

U.S. PATENT DOCUMENTS

2008/0302651 A1* 12/2008 Arai .................. C02F 1/4602
                                                          204/157.15
2011/0220516 A1*  9/2011 Finfrock ................. C25B 1/04
                                                          205/628
(Continued)

FOREIGN PATENT DOCUMENTS

KR       10-0995713 B1    11/2010
KR    10-2011-0039647 A    4/2011
(Continued)

*Primary Examiner* — Zulmariam Mendez
(74) *Attorney, Agent, or Firm* — Arent Fox LLP

(57) ABSTRACT

The present invention relates to an apparatus for producing hydrogen water, and more particularly, to a portable apparatus for producing hydrogen water including: a container held at an upper side to store water; a hydrogen generating unit positioned at a lower part of the container, and for dissolving hydrogen generated by electrolyzing water stored in the container in the water stored in the container, and converting the water in the container to hydrogen water; and a power supply unit for applying power to the hydrogen generating unit. The portable apparatus for producing hydrogen water of the present invention may enable a user to conveniently drink hydrogen water regardless of the time and the place.

2 Claims, 7 Drawing Sheets

(51) Int. Cl.
  *C25B 15/02* (2006.01)
  *C25B 1/10* (2006.01)
  *C25B 1/04* (2006.01)
  *C02F 1/467* (2006.01)
  *C25B 11/03* (2006.01)
  *C02F 1/461* (2006.01)

(52) U.S. Cl.
  CPC ............... *C02F 2001/46133* (2013.01); *C02F 2001/46161* (2013.01); *C02F 2201/4614* (2013.01); *C02F 2201/4618* (2013.01); *C02F 2201/46115* (2013.01); *C02F 2201/46135* (2013.01); *C02F 2201/46145* (2013.01); *C02F 2201/46165* (2013.01); *C02F 2209/001* (2013.01); *C02F 2209/03* (2013.01); *C02F 2209/42* (2013.01); *C02F 2307/02* (2013.01); *Y02E 60/364* (2013.01); *Y02E 60/366* (2013.01)

(58) Field of Classification Search
  USPC ........................................................ 204/271
  See application file for complete search history.

(56) References Cited

U.S. PATENT DOCUMENTS

2013/0105307 A1* 5/2013 Pavlovic ................. C25B 11/02
  204/262
2014/0106007 A1* 4/2014 Shanahan ............. C02F 1/4674
  424/661

FOREIGN PATENT DOCUMENTS

KR  10-1076631 B1  10/2011
KR  10-1250470 B1  4/2013

* cited by examiner

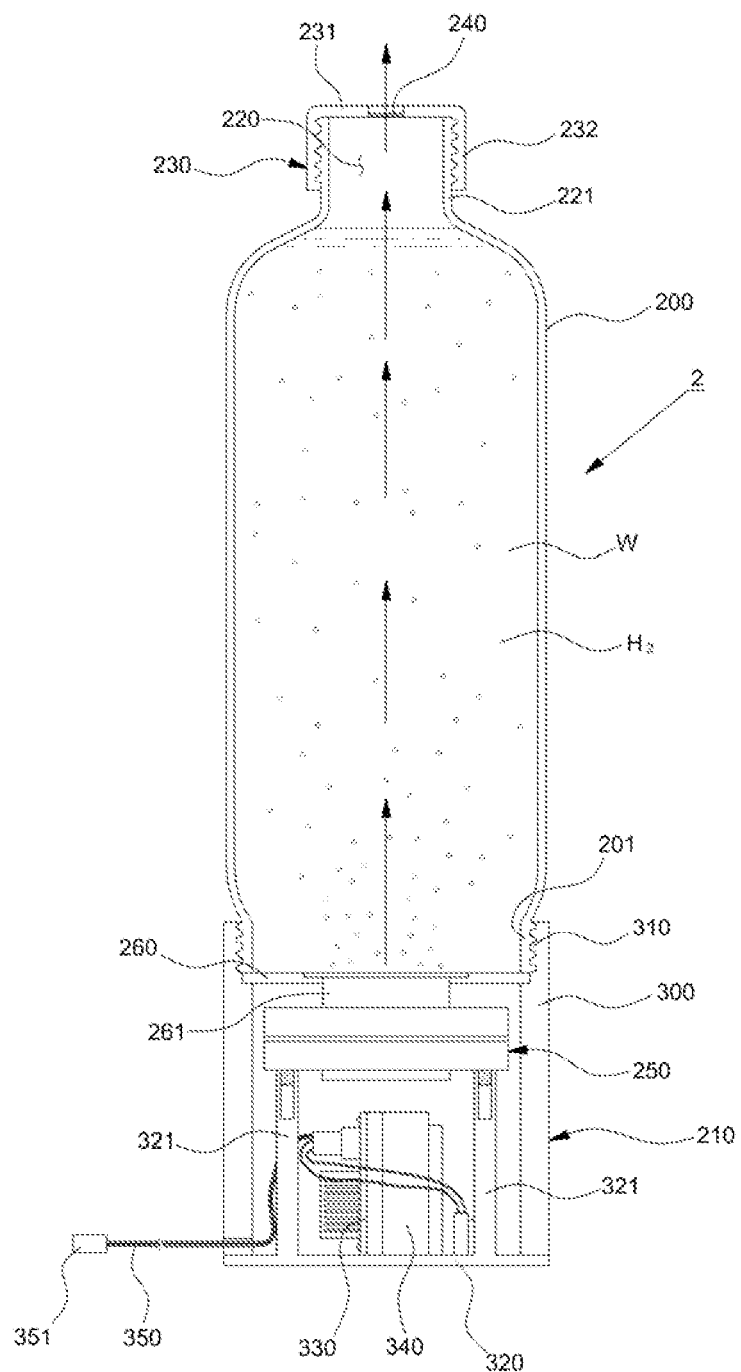

PORTABLE APPARATUS FOR PRODUCING HYDROGEN WATER

CROSS-REFERENCE TO RELATED APPLICATIONS

This application claims priority under 35 U.S.C. § 119 to Korean Patent Application Nos. 10-2014-3874, filed on Jan. 13, 2014 and 10-2014-74472, filed on Jun. 18, 2014, in the Korean Intellectual Property Office, the disclosure of which is incorporated herein by reference in its entirety.

BACKGROUND OF THE INVENTION

1. Field of the Invention

The present invention relates to an apparatus for producing hydrogen water, and more particularly, to a portable apparatus for producing hydrogen water including: a container held at an upper part of the apparatus to store water; a hydrogen generating unit positioned at a lower part of the container, and for dissolving hydrogen generated by electrolyzing water stored in the container in the water stored in the container, and converting the water in the container to hydrogen water; and a power supply unit for applying power to the hydrogen generating unit.

The portable apparatus for producing hydrogen water of the present invention may enable a user to conveniently drink hydrogen water regardless of the time and the place.

2. Description of the Related Art

In general, hydrogen water refers to water in which hydrogen is dissolved in large amounts.

It has been reported that dissolved hydrogen exhibits an antioxidant action of removing hydroxyl radical that is active oxygen, so that the hydrogen water prevents aging, is helpful in preventing diabetes, high blood pressure, artery hardening, cancers, and Alzheimer's disease, and has an effect in skin care, diet, fatigue recovery, sexual health, athletic performance enhancement, immunity improvement, and handover relief.

Examples of published related arts of the apparatus for producing hydrogen water include Korean Patent Application Laid-Open No. 10-2011-0039647 entitled "Apparatus for Producing Electrolysis Hydrogen Water", Korean Patent No. 1076631 entitled "Apparatus for Producing Hydrogen Water", Korean Patent No. 995713 entitled "Electrode Assembly for Electrolysis, Apparatus for Producing Oxygen and hydrogen including the same, and Apparatus for Producing Hydrogen Water including the same", and Korean Patent No. 1250470 entitled "Apparatus for Producing Dissolved Hydrogen Water".

However, the published related arts have a relatively large volume and a complex structure because components, such as an electrolyzer and a fluid circulating device for producing hydrogen water, are installed, so that it is difficult for a user to portably use the published related arts.

SUMMARY OF THE INVENTION

The present invention has been made in an effort to provide an apparatus for producing hydrogen water having a simple structure and excellent portability.

An exemplary embodiment of the present invention provides a portable apparatus for producing hydrogen water including: a container positioned at an upper part of the apparatus and configured to store water; a hydrogen generating unit positioned at a lower part of the container, and configured to dissolve hydrogen generated by electrolyzing the water stored in the container water in the water stored in the container, and convert the water in the container into hydrogen water; and a power supply unit configured to apply power to the hydrogen generating unit.

According to the exemplary embodiments of the present invention, the portable apparatus for producing hydrogen water has a structure, in which general water bottle is held through the insertion opening at an upper part or water is stored in a water bottle formed at an upper part, and water is electrolyzed by the embedded hydrogen generating unit, so that water is converted into hydrogen water, thereby enabling a user to simply and conveniently produce hydrogen water and drink the hydrogen water.

The hydrogen water generating unit is integrated inside the case, so that it is possible to manufacture a small apparatus for producing hydrogen water, thereby achieving excellent portability.

A thin film, which allows only gas to flow, is formed at the cap, thereby decreasing an internal pressure applied to the container and preventing leakage of water to the outside of the container due to the internal pressure.

BRIEF DESCRIPTION OF THE DRAWINGS

FIG. 8 is a diagram illustrating an operation state of the portable apparatus for producing hydrogen water according to the second exemplary embodiment of the present invention.

DETAILED DESCRIPTION OF THE EMBODIMENTS

Hereinafter, a configuration of a portable apparatus for producing hydrogen water of the present invention will be described with reference to the drawings.

However, the disclosed drawings are provided as an example for fully transferring the spirit of the present invention to those skilled in the art. Therefore, the present invention is not limited to the drawings suggested below, and may be embodied as other aspects.

The terminologies used herein have the meanings that those skilled in the art generally understand, if not defined otherwise, and the detailed description of a related known function and configuration that may make the purpose of the present invention unnecessarily ambiguous will be omitted in the following description and accompanying drawings.

The present invention is a portable apparatus for producing hydrogen water including: a container held at an upper side to store water; a hydrogen generating unit positioned at a lower part of the container, and for dissolving hydrogen generated by electrolyzing water stored in the container in the water stored in the container, and converting the water in the container to hydrogen water; and a power supply unit for applying power to the hydrogen generating unit.

Particularly, an apparatus for producing hydrogen water of the present invention is implemented by a portable apparatus for producing hydrogen water according to a first exemplary embodiment, in which an outlet part of a water bottle storing water is inserted into the apparatus, and the water stored in the water bottle is converted into hydrogen water, and a portable apparatus for producing hydrogen water according to a second exemplary embodiment, in which water stored in a water bottle is converted into hydrogen water by a hydrogen generating unit which has a water bottle appearance and is embedded at a lower part of the apparatus.

An apparatus for producing hydrogen water having excellent portability is provided by the apparatuses for producing hydrogen water according to the first and second exemplary embodiments of the present invention.

First, a configuration and an operation of a portable apparatus for producing hydrogen water according to a first exemplary embodiment of the present invention will be described in detail with reference to FIGS. 1 to 4.

Figure 1:
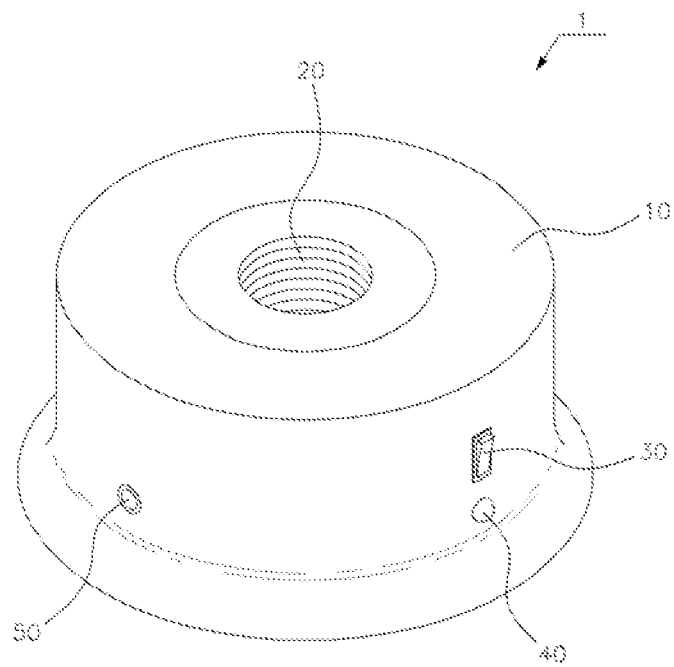
FIG. 1 is a perspective view illustrating a portable apparatus for producing hydrogen water according to a first exemplary embodiment of the present invention.
Figure 2:
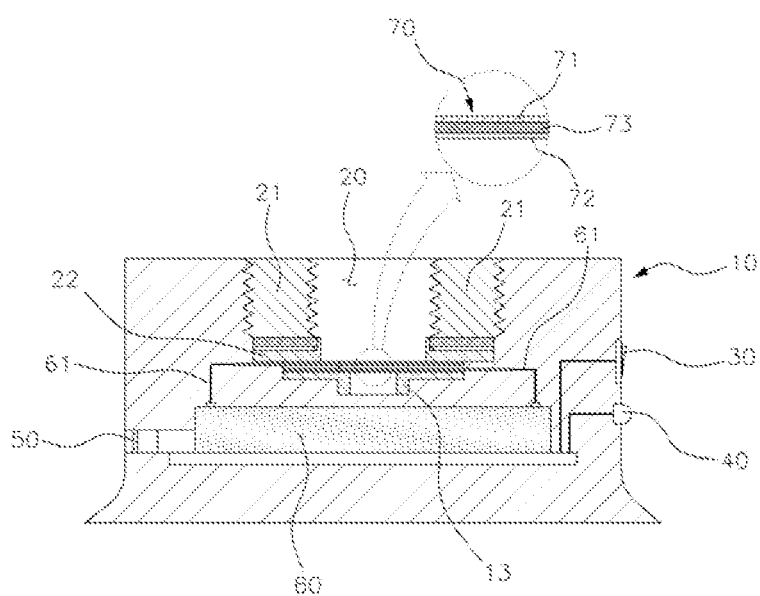
FIG. 2 is an internal cross-sectional view illustrating the portable apparatus for producing hydrogen water according to the first exemplary embodiment of the present invention.

FIG. 1 is a perspective view illustrating a portable apparatus for producing hydrogen water according to a first exemplary embodiment of the present invention, and FIG. 2 is an internal cross-sectional view illustrating the portable apparatus for producing hydrogen water according to the first exemplary embodiment of the present invention.

Referring to FIG. 1, an apparatus 1 for producing hydrogen water of the present invention includes a case 10, which has a cylindrical appearance, is provided with an insertion opening 20, into which an outlet part of a bottle is inserted, at an upper part thereof, and includes a switch 30, a display unit 40, and a power input terminal 50 installed on an outer peripheral surface thereof.

The case 10 may be formed of a light plastic material with excellent durability, and the insertion opening 20 may be manufactured with a size at which an outlet (mouth) of a commercially sold general water bottle may be inserted into the insertion opening 20.

Referring to an internal cross-sectional view of FIG. 2, the insertion opening 20, into which a part of an outlet 110 is inserted in the state where a water bottle 100 is stood upside down, is formed at the upper part of the case of the apparatus 1 for producing hydrogen water according to the first exemplary embodiment of the present invention, a lateral wall 21 is installed on an internal wall of the insertion opening 20, and a packing member 22 is constructed at a lower end of the lateral wall 21, thereby preventing water flowing through the outlet 110 of the water bottle 100 inserted into the insertion opening 20 from leaking to the case 10.

A battery 60 is held inside the case 10, and both electrodes of the battery 60 are connected with a pair of wires 61 to apply power to one electrode 71 and the other electrode 72 of an electrode unit 70 which is to be described below.

The battery 60 is configured to be connected with the switch 30 for controlling power of the battery 60, the display unit 40 for displaying whether power is applied, and the power input terminal 50 for inputting external power for charging the battery 60, and continuously supply a current of 1 A to 10 A at about 3.5 V to 12 V.

The display unit 40 may adopt a general mini bulb or a light emitting diode (LED) lamp.

In the meantime, although not illustrated, a peripheral circuit for applying power to and charging the battery 60, making the display unit 40 emit light, and operating the switch 30 is embedded inside the case 10, and the peripheral circuit may adopt a general circuit, so that a detailed description thereof will be omitted.

The electrode unit 70 is installed at a lower end part of the insertion opening 20. The electrode unit 70 serves to electrolyze water stored in the water bottle 100 inserted into the insertion opening 20 and generate hydrogen, and includes one electrode 71 disposed at a side facing the insertion opening 20, the other electrode 72 disposed on an opposing surface of one electrode 71, and a partition film 73 interposed between one electrode 71 and the other electrode 72.

One electrode 71 and the other electrode 72 are a type of a catalytic electrode enabling hydrogen to be easily diffused, and having high current density allowance, and may use a precious metal, such as platinum or iridium.

In the exemplary embodiment of the present invention, a platinum electrode is used as one electrode 71 at an upper part of the partition film 73, and an iridium electrode is used as the other electrode 72 at a lower part of the partition film 73, so that the other electrode 72 forms a positive electrode and one electrode 71 forms a negative electrode.

The partition film 73 adopts a polymer film. Then, the electrodes serving as the catalyst electrolyze water molecules by one electrode 71 and the other electrode 72, so that hydrogen molecules pass through the partition film from the other electrode 72 that is the positive electrode, are transferred to one electrode 71 that is the negative electrode, and upwardly move to the water inserted into the insertion opening 20, so that the hydrogen molecules are dissolved in the water.

In the meantime, a pressure sensor may be embedded inside the case 10 to sense the amount of water when the water bottle 100 is inserted, an inclination sensor may be embedded inside the case 10 to sense a degree of inclination of the case 10, or a water level sensor may be embedded at a lower part or an inner peripheral surface of the insertion opening 20 to sense whether water stored in the water bottle 100 exists.

Hereinafter, an operation of the portable apparatus 1 for producing hydrogen water according to the first exemplary embodiment of the present invention configured as described above will be described.

Figure 3:
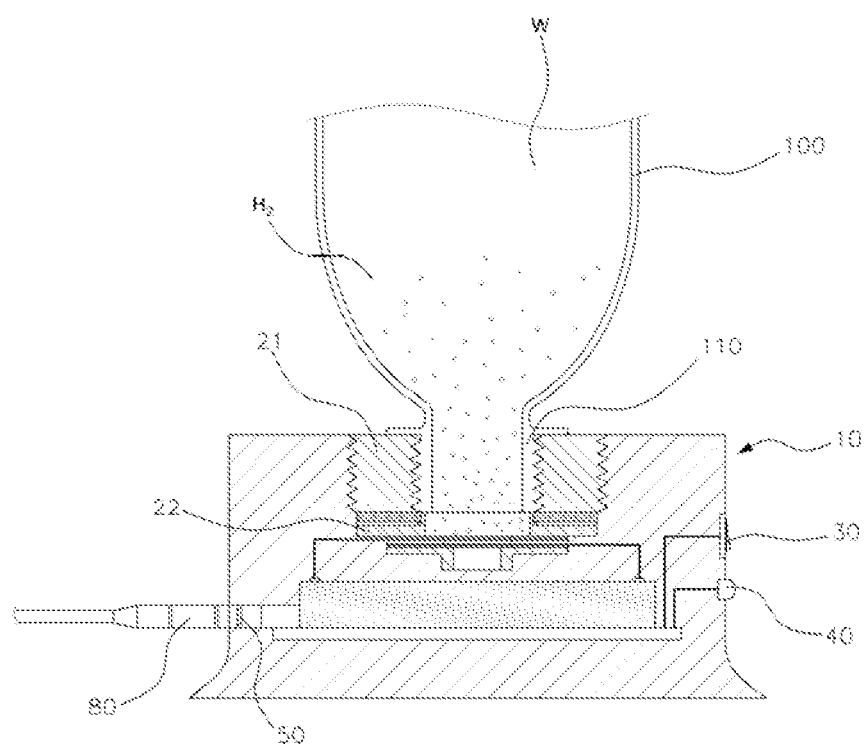
FIG. 3 is a diagram illustrating an operation state of the portable apparatus for producing hydrogen water according to the first exemplary embodiment of the present invention.

FIG. 3 is a diagram illustrating an operation state of the portable apparatus for producing hydrogen water according to the first exemplary embodiment of the present invention.

Referring to FIG. 3, first, a part of the outlet (mouth) 110 of the water bottle 100 in the state of storing water W is inserted into the insertion opening 20 formed on an upper surface of the case 10 in the state where the case 10 of the apparatus 1 for producing hydrogen water of the present invention is held in plane.

In this case, the part of the outlet 110 of the water bottle 100 in the inserted state is engaged with the lateral wall 21 of the insertion opening 20, so that the water bottle 100 is vertically fixed to the insertion opening 20 of the case 10, and the packing member 22 at the lower end of the lateral wall 21 prevents water from leaking from the outlet 110.

The water W stored in the water bottle 100 is in contact with one electrode 71 of the electrode unit 70, and when a user switches the switch 30 into an on-state, the display unit 40 represents a power application state while emitting light, and power of the embedded battery 60 is applied to one electrode 71 and the other electrode 72 through the wires 61.

Then, the water W stored in the water bottle 100 is dropped in a lower direction, and water molecules are decomposed by a voltage applied through one electrode 71 and the other electrode 72 of the electrode unit 70.

In this case, the water molecules are decomposed by one electrode 71 and the other electrode 72 performing a sort of catalyst electrode function, so that the hydrogen molecules pass through the partition film 73 formed of a polymer material from the other electrode 72 that is the positive electrode, are transferred to one electrode 71 that is the negative electrode, and upwardly move to the water inserted into the insertion opening 20.

The water W stored in the water bottle 100 is produced to hydrogen water having the large amount of hydrogen dissolved while the upwardly moving hydrogen molecules are decomposed in the water.

As a result of the experiment of the inventor of the present invention, the apparatus for producing hydrogen water according to the exemplary embodiment of the present invention could produce hydrogen water having high density hydrogen dissolved between 600 ppb to 1,600 ppb under the condition of an input voltage of 3.5 V to 12 V and an input current of 1 A to 10 A of the battery 60.

Then, when the water stored in the water bottle 100 is converted into the hydrogen water, the user may drink the stored hydrogen water by switching the switch 30 to an off-state and detaching the water bottle 100 from the insertion opening 20.

Accordingly, the apparatus 1 for producing hydrogen water according to the present invention operated as described above includes the battery 60 embedded inside the case 10, thereby being independently operated without depending on an external power supply, and the apparatus 1 for producing hydrogen water has a small structure of generating hydrogen by the electrode unit 70 embedded inside the case 10, thereby achieving very excellent portability and use convenience.

Figure 4:
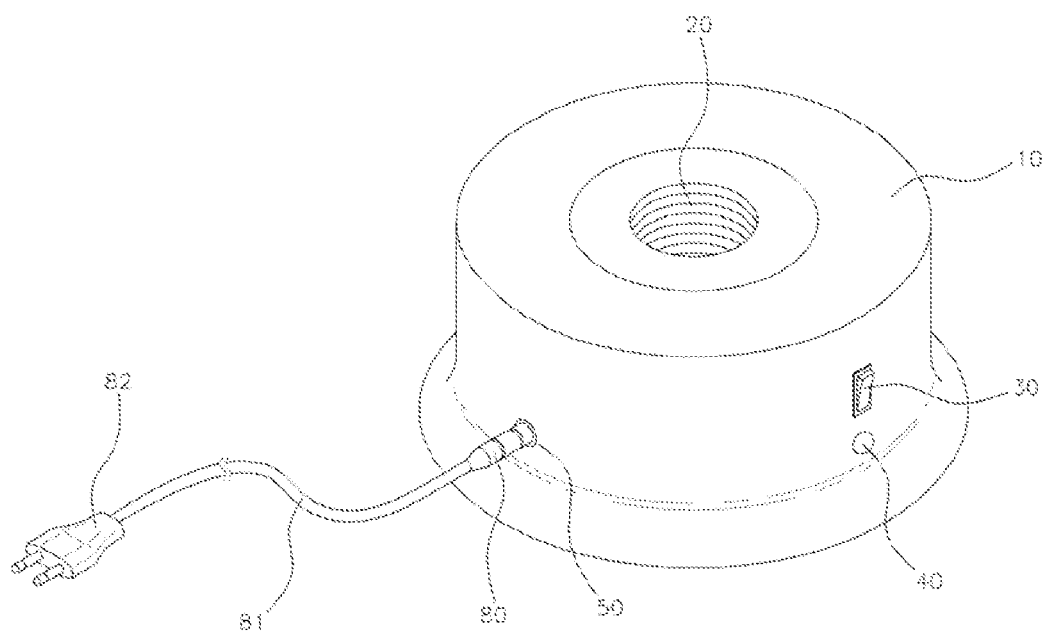
FIG. 4 is a diagram illustrating a power input state of the portable apparatus for producing hydrogen water according to the first exemplary embodiment of the present invention.

In the meantime, in the apparatus 1 for producing hydrogen water according to the first exemplary embodiment of the present invention, as illustrated in FIG. 4, a power connection line 80 may be coupled to the power input terminal 50 constructed on the outer peripheral surface of the case 10, and a plug socket 82 constructed in a power supply line 81 may be connected to a general home power supply to charge the embedded battery 60.

The apparatus 1 for producing hydrogen water according to the first exemplary embodiment of the present invention may apply necessary power by constructing a general constant voltage circuit (not illustrated) inside the case 10 separately from the charging of the battery 60, and supplying general external commercially used power to the constant voltage circuit.

Next, a configuration and an operation of a portable apparatus for producing hydrogen water according to a second exemplary embodiment of the present invention will be described in detail with reference to FIGS. 5 to 8.

Figure 5:
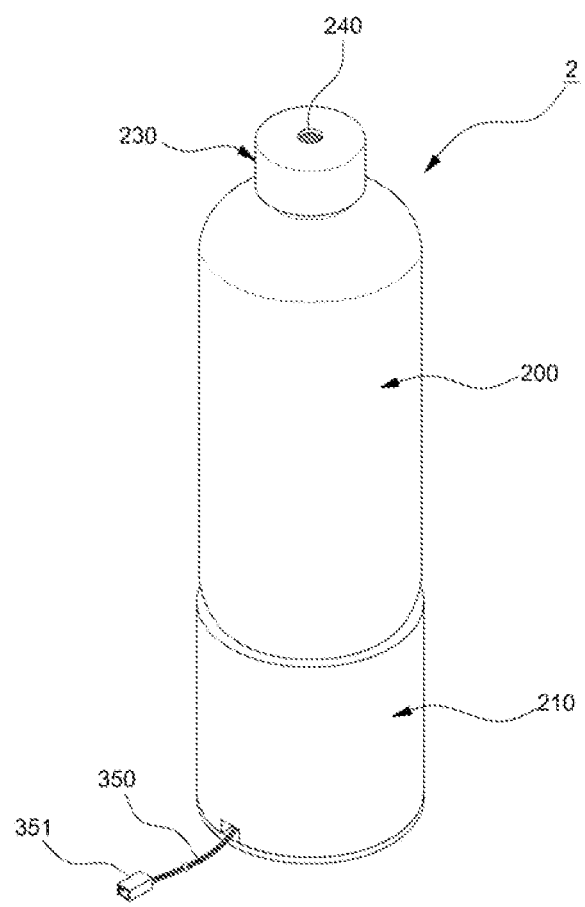
FIG. 5 is a perspective view illustrating a portable apparatus for producing hydrogen water according to a second exemplary embodiment of the present invention.
Figure 6:
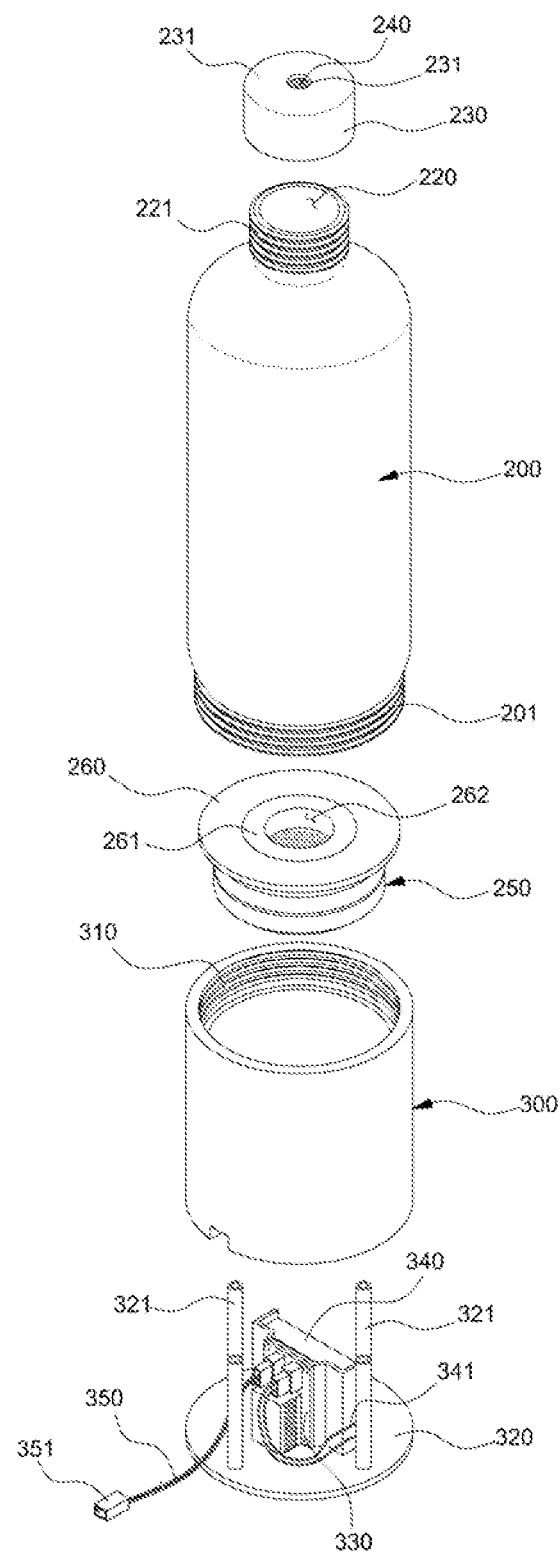
FIG. 6 is an exploded perspective view illustrating the portable apparatus for producing hydrogen water according to the second exemplary embodiment of the present invention.

FIG. 5 is a perspective view illustrating a portable apparatus for producing hydrogen water according to a second exemplary embodiment of the present invention, and FIG. 6 is an exploded perspective view illustrating the portable apparatus for producing hydrogen water according to the second exemplary embodiment of the present invention.

First, referring to FIG. 5, a portable apparatus 2 for producing hydrogen water according to a second exemplary embodiment of the present invention includes a container 200 having a general water bottle appearance and for storing water, a hydrogen generating unit 210 coupled to a lower part of the container 200 to generate hydrogen for converting the water stored in the container 200 into hydrogen water and supply the generated hydrogen into the container 200, and a cap 230 for shielding a part of a mouth 220 of the container 200.

Referring to an exploded perspective view of FIG. 6, the container 200 includes a connection surface 201 at a lower part thereof, and the connection surface 201 is engaged with a coupling surface 310 formed at an upper end of a housing 300 configuring a case of the hydrogen generating unit 210.

A screw thread 221 engaged with an inner surface of the cap 230 is formed at an outer circumference of the mouth 220 at the upper part of the container 200.

The housing 300 of the hydrogen generating unit 20 has an opened upper part and an opened lower part, and an upper opened surface of the housing 300 is coupled with a blocking panel 260 for shielding the lower part of the container 200, and a finishing plate 320 is coupled with a lower opened surface of the housing 300.

The blocking panel 260 includes a hydrogen generating unit 250 at a lower side thereof, and the hydrogen generating unit 250 electrolyzes water stored in the container 200 to generate hydrogen, supplies the generated hydrogen to the container 200, and converts the water stored in the container 200 into hydrogen water with the large amount of hydrogen dissolved.

To this end, a through-hole 262 for supplying the water of the container 200 to the hydrogen generating unit 250 is formed at a center part of the blocking panel 260, and a circular ring 261 for preventing leakage is attached to an inner peripheral surface of the through-hole 262, thereby preventing the water of the container 200 from leaking to an inner side of the housing 300 when the water of the container 200 is in contact with the hydrogen generating unit 250.

A control substrate 330 for controlling an operation of the hydrogen generating unit 250 is attached to the finishing plate 320 for shielding the lower opened surface of the housing 300, and a battery 340 for applying power to the hydrogen generating unit 250 and the control substrate 330 is mounted on the finishing plate 320.

Both electrode of the battery 340 is connected with a pair of wires 341 to apply power to one electrode 251 and the other electrode 252 of the hydrogen generating unit 250.

Although not illustrated in the drawing, a switch (not illustrated) for controlling power of the battery 340, and a lamp formed of a mini bulb or an LED to display whether power is applied may be constructed.

A power supply line 350 for connecting an external power supply for charging the battery 340 is connected with the control substrate 330, and a power supply jack 351 is constructed in the power supply line 351 to receive power from a general external power supply (not illustrated) and charge the battery 340. The apparatus 2 for producing hydrogen water according to the second exemplary embodiment of the present invention applies power with 1 A to 10 A at about 3.5 V to 5 V to charge the battery 340.

A general peripheral circuit for charging the battery 340, which applies power to the hydrogen generating unit 250, is embedded in the control substrate 330.

In the meantime, non-described reference numeral 321 denotes a plurality of rods 321 vertically protruding from the finishing plate 120, and distal ends of the rods 321 are attached to the hydrogen generating unit 250 to serve to support the hydrogen generating unit 250.

Figure 7:
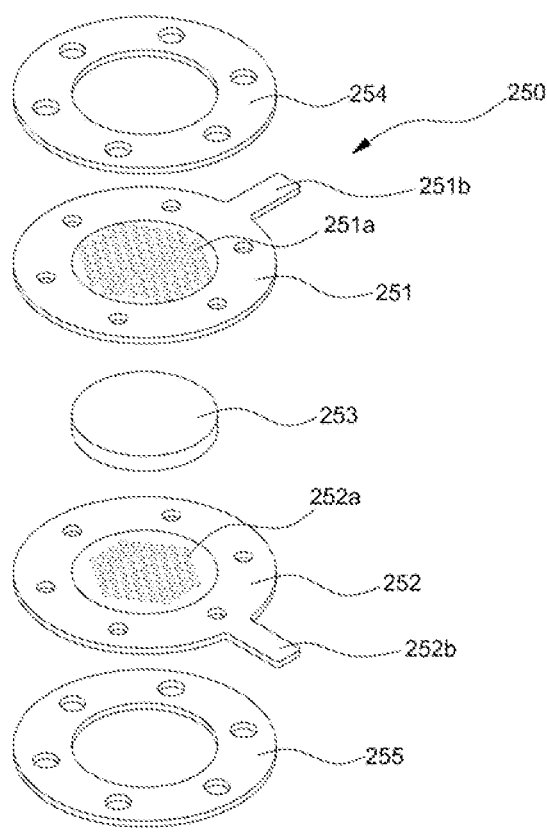
FIG. 7 is an exploded perspective view illustrating a hydrogen generating unit of the portable apparatus for producing hydrogen water according to the second exemplary embodiment of the present invention.

FIG. 7 is an exploded perspective view illustrating the hydrogen generating unit of the portable apparatus for producing hydrogen water according to the second exemplary embodiment of the present invention.

Referring to FIG. 7, the hydrogen generating unit 50 is a unit for electrolyzing water stored in the container 20 to generate hydrogen, and has a publicly known general structure.

That is, the hydrogen generating unit 250 includes a partition film 253, the upper electrode 251 positioned at an upper part of the partition film 253 and a lower electrode 252 positioned at a lower part of the partition film 253, and an upper cover 254 is coupled to an upper part of the upper electrode 251, and a lower cover 255 is coupled to a lower part of the lower electrode 252.

The upper electrode 251 and the lower electrode 152 are provided with a plurality of holes 251a and 252a densely formed at center parts thereof.

Electrode terminals 251b and 252b for inputting a current protrude from one sides of the upper electrode 251 and the lower electrode 252, respectively, and a positive voltage and a negative voltage of about 3.5 V to 5 V are applied to the electrode terminals 251b and 252b, respectively.

Although not illustrated, a packing member (not illustrated) for insulation is interposed on surfaces of the upper electrode 251 and the lower electrode 252, thereby preventing the upper electrode 251 and the lower electrode 252 from being short-circuited, and the upper electrode 251 and the lower electrode 252, and the upper cover 254 and the lower cover 255 are fastened with fixing bolts (not illustrated) and nuts (not illustrated), thereby preventing water passing through the partition film 253 from leaking.

The partition film 253 may adopt a polymer film mainly formed of a silicon material, and the electrodes serving as catalyst by the upper electrode 251 and the lower electrode 252 ionize and decompose water molecules, and generated hydrogen molecules pass through the partition film 253 from the lower electrode 252 that is a positive electrode and are transmitted to the upper electrode 251 that is a negative electrode to be discharged to the water stored inside the container 200.

Similar to the aforementioned first exemplary embodiment, the upper electrode 251 and the lower electrode 252 are a sort of catalytic electrode enabling hydrogen to be easily diffused, and having high current density allowance, and may use a precious metal, such as platinum or iridium.

In the apparatus for producing hydrogen water according to the second exemplary embodiment of the present invention, a negative electrode is formed by using a platinum electrode as the upper electrode 251, and a positive electrode is formed by using an iridium electrode as the lower electrode 252.

Accordingly, when a positive voltage and a negative voltage are applied to the upper electrode 251 and the lower electrode 252 of the hydrogen generating unit 250 of the present invention configured as described above, water stored inside the container 200 is electrolyzed, so that hydrogen molecules are generated, and the generated hydrogen molecules convert the water stored inside the container 200 into hydrogen water after a predetermined time while flowing into the container 200.

In this case, when hydrogen flows into the container 200 for a predetermined time, a pressure inside the container 200 increases, so that there is a concern that leakage may be generated between the connection surface 201 of the container 200 and the coupling surface 310 of the housing 300 or on an outer peripheral surface of the circular ring 261 of the blocking panel 260 including the hydrogen generating unit 250 due to the increase in the internal pressure.

In order to solve the concern, a hole 232 having a predetermined diameter is perforated in a ceiling surface 231 of the cap 230 for shielding the mouth 220 of the container 200 of the present invention, and a thin film 240, which disallows a liquid component to pass through and allows a gas component to pass through, is attached to the hole 232. A publicly known general member is used as the thin film 240, which allows only a gas component to flow.

Accordingly, an internal pressure applied inside the container 200 is decreased by the thin film 240 attached to the cap 230 as described above, so that it is possible to prevent the leakage phenomenon inside and outside the container 200 described above.

In the meantime, the amount of water stored in the container 200 may be sensed by embedding a pressure sensor into the housing 300 configured as described above, or whether the water stored in the container 200 exists may be sensed by embedding a water level sensor in an inner peripheral surface of the container 200.

Hereinafter, an operation of the portable apparatus 2 for producing hydrogen water according to the second exemplary embodiment of the present invention configured as described above will be described. FIG. 8 is a diagram illustrating an operation state of the portable apparatus for producing hydrogen water according to the second exemplary embodiment of the present invention.

Referring to FIG. 8, first, the cap 230 coupled to the part of the mouth 220 of the container 200 of the portable apparatus 2 for producing hydrogen water according to the second exemplary embodiment of the present invention is opened, water is poured to the part of the mouth 220 of the container 200 to store water W inside the container 200, and then the cap 230 is coupled to the part of the mouth 220 again.

Then, the water stored inside the container 200 is dropped in a lower direction to be in contact with the hydrogen generating unit 250 while being discharged through the through-hole 262 of the blocking panel 260 for shielding the lower part of the container 200. In this case, the circular ring 261 is attached into the inner side of the through-hole 262, thereby preventing leakage.

In this case, when a user switches a switch (not illustrated) attached to the housing 300 to an on-state, power of the battery 340 embedded in the housing 300 is applied to one electrode 251 and the other electrode 252 of the hydrogen generating unit 250 through the wires 341.

Then, water molecules of the water W, which has been discharged through the through-hole 262 of the blocking panel 260 and in contact with the hydrogen generating unit 250, are decomposed by the voltages applied to one electrode 251 and the other electrode 252 by the hydrogen generating unit 250.

Subsequently, the water molecules are ionized and decomposed by one electrode 251 and the other electrode 252 functioning as a sort of a catalyst electrode, so that hydrogen molecules are transferred from the other electrode 252 that is the positive electrode to one electrode 251 that is the negative electrode via the partition film 253 formed of a polymer material to upwardly move into the water W contacted through the through-hole 262 and be dissolved in water while forming vapors H2, so that the water W stored in the container 20 is produced to hydrogen water having the large amount of hydrogen dissolved.

In this case, the internal pressure of the container 200 increased while the hydrogen enters the container 200, but gas forming the increased internal pressure is discharged to the outside of the container 200 through the thin film 240 of the cap 230, so that the internal pressure applied inside the container 200 naturally decreases, thereby preventing a leakage phenomenon inside and outside the container 200.

As a result of the experiment of the inventor of the present invention, the apparatus for producing hydrogen water according to the second exemplary embodiment of the present invention could produce hydrogen water having high density hydrogen dissolved between 600 ppb to 1,600 ppb under the condition of an input voltage of 3.5 V to 5V and an input current of 1 A to 10 A of the battery 340.

Then, when the water stored in the container 200 is converted into hydrogen water, the user may drink the hydrogen water by switching the switch (not illustrated) to an off-state, opening the cap 230 of the container 200, and taking out the hydrogen water through the mouth 220.

Accordingly, the portable apparatus 2 for producing hydrogen water according to the second exemplary embodiment of the present invention operated as described above includes the battery 340 embedded inside the housing 300, thereby being independently operated without depending on an external power supply, and the portable apparatus 2 for producing hydrogen water may simply produce hydrogen water by the hydrogen generating unit 250 embedded inside the housing 300.

The apparatus 2 for producing hydrogen water according to the second exemplary embodiment of the present invention may be repeatedly used by charging the embedded battery 340 by connecting the power jack 351 of the power supply line 350 connected to the control substrate 330 to a general external power supply (not illustrated).

The apparatus 2 for producing hydrogen water according to the second exemplary embodiment of the present invention may also be used by applying necessary power by constructing a general constant voltage circuit (not illustrated) inside the housing 300 separately from the charging of the battery 340, and supplying general external commercially used power to the constant voltage circuit.

The exemplary embodiments of the sliding operation type electronic auto shift lever of the present invention have been described in detail, but the exemplary embodiments merely suggest the specific example for helping understanding of the present invention, and do not intend to limit the scope of the present invention. It is apparent to those skilled in the art that other than the exemplary embodiments disclosed herein, other modifications may be implemented based on the technical spirit of the present invention.

What is claimed is:

1. A portable apparatus for producing hydrogen water, comprising:
    a container positioned at an upper part and configured to store water;
    a hydrogen generating unit disposed at a lower part of the container, and configured to dissolve hydrogen generated by electrolyzing the water stored in the container, and convert the water in the container into hydrogen water; and
    a power supply unit configured to apply power to the hydrogen generating unit,
    wherein the container comprises a container shaped like a water bottle having a cap for shielding a part of an outlet formed at an upper part thereof;
    the hydrogen generating unit is a hydrogen generating unit including a hydrogen generating unit coupled to a lower part of the container to generate hydrogen for converting water stored in the container into hydrogen water;
    wherein the container is provided with a connection surface at a lower part thereof, and the connection surface is engaged with a coupling surface formed at an upper end of a housing configuring a case of the hydrogen generating unit;
    wherein the housing includes an opened upper part and an opened lower part, and an upper opened surface is coupled with a shielding panel for shielding a lower part of the container, and a lower opened surface of the housing is coupled with a finishing plate;
    wherein the shielding panel includes the hydrogen generating unit at a lower side thereof;
    wherein a through-hole for supplying the water of the container to the hydrogen generating unit is formed at a center part of the shielding panel, and a circular ring for preventing leakage is attached to an inner peripheral surface of the through-hole;
    wherein a control substrate for controlling an operation of the hydrogen generating unit is attached onto the finishing plate, and a battery for applying power to the hydrogen generating unit and the control substrate is mounted on the finishing plate;
    wherein the hydrogen generating unit includes a partition film, an upper electrode positioned at an upper part of the partition film, and a lower electrode positioned at a lower part of the partition film, and an upper cover is coupled to an upper part of the upper electrode, and a lower cover is coupled to a lower part of the lower electrode;
    wherein the upper electrode and the lower electrode are provided with a plurality of holes densely formed at center parts thereof, and electrode terminals for inputting a current protrudes from one side of the upper electrode and the lower electrode, respectively, such that a positive voltage and a negative voltage are applied thereto, respectively.

2. The portable apparatus of claim 1, wherein a thin film, which disallows a liquid component to pass through and allows a gas component to pass through, is attached to a ceiling surface of the cap.

* * * * *